US008285670B2

(12) United States Patent
Chen et al.

(10) Patent No.: US 8,285,670 B2
(45) Date of Patent: Oct. 9, 2012

(54) DYNAMICALLY MAINTAINING COHERENCY WITHIN LIVE RANGES OF DIRECT BUFFERS

(75) Inventors: Tong Chen, Yorktown Heights, NY (US); John K. O'Brien, South Salem, NY (US); Tao Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 12/177,507

(22) Filed: Jul. 22, 2008

(65) Prior Publication Data

US 2010/0023700 A1 Jan. 28, 2010

(51) Int. Cl.
G06F 7/00 (2006.01)
(52) U.S. Cl. .................... 707/609; 717/141; 711/117
(58) Field of Classification Search .......... 717/140, 717/141, 142, 160; 707/609; 711/117, 135
See application file for complete search history.

(56) References Cited

U.S. PATENT DOCUMENTS

| | | | |
|---|---|---|---|
| 5,146,589 A | 9/1992 | Peet et al. | |
| 5,555,398 A | 9/1996 | Raman | |
| 5,579,520 A | 11/1996 | Bennett | |
| 5,909,580 A * | 6/1999 | Crelier et al. | 717/141 |
| 6,249,520 B1 * | 6/2001 | Steely et al. | 370/368 |
| 6,263,406 B1 | 7/2001 | Uwano et al. | |
| 6,336,154 B1 * | 1/2002 | McCarthy et al. | 710/35 |
| 6,516,462 B1 | 2/2003 | Okunev et al. | |
| 6,598,128 B1 | 7/2003 | Yoshioka et al. | |
| 6,651,115 B2 | 11/2003 | Anderson | |
| 6,665,671 B2 | 12/2003 | Coutant | |
| 6,718,294 B1 | 4/2004 | Bortfield | |
| 6,901,587 B2 * | 5/2005 | Kramskoy et al. | 717/154 |
| 7,107,583 B2 | 9/2006 | Hobbs et al. | |
| 7,210,122 B2 * | 4/2007 | Shuf et al. | 717/116 |
| 7,380,086 B2 * | 5/2008 | Archambault et al. | 711/170 |
| 7,411,694 B2 * | 8/2008 | Nomizu | 358/1.16 |
| 7,747,989 B1 * | 6/2010 | Kissell | 717/148 |
| 2002/0169900 A1 | 11/2002 | Hiji | |
| 2004/0093467 A1 | 5/2004 | Shen et al. | |
| 2004/0205740 A1 | 10/2004 | Lavery et al. | |
| 2005/0223359 A1 | 10/2005 | Rao Nagaraju et al. | |
| 2005/0246700 A1 | 11/2005 | Archambault et al. | |
| 2006/0070054 A1 | 3/2006 | Naik et al. | |
| 2006/0136878 A1 | 6/2006 | Raghunath et al. | |
| 2006/0155935 A1 | 7/2006 | Jones et al. | |

(Continued)

OTHER PUBLICATIONS

U.S. Appl. No. 12/125,167, filed May 22, 2008, Chen et al.

(Continued)

Primary Examiner — John E Breene
Assistant Examiner — Mohammad Kabir
(74) Attorney, Agent, or Firm — Francis Lammes; Stephen J. Walder, Jr.; Matthew B. Talpis

(57) ABSTRACT

Reducing coherency problems in a data processing system is provided. Source code that is to be compiled is received and analyzed to identify at least one of a plurality of loops that contain a memory reference. A determination is made as to whether the memory reference is an access to a global memory that should be handled by a direct buffer. Responsive to an indication that the memory reference is an access to the global memory that should be handled by the direct buffer, the memory reference is marked for direct buffer transformation. The direct buffer transformation is then applied to the memory reference.

17 Claims, 10 Drawing Sheets

U.S. PATENT DOCUMENTS

| | | |
|---|---|---|
| 2006/0179174 A1 | 8/2006 | Bockhaus et al. |
| 2006/0259691 A1 | 11/2006 | Jeremiassen |
| 2006/0265552 A1 | 11/2006 | Davis et al. |
| 2007/0038987 A1 | 2/2007 | Ohara et al. |
| 2007/0079073 A1 | 4/2007 | Rosenbluth et al. |
| 2007/0101318 A1 | 5/2007 | Tatsuoka et al. |
| 2007/0124732 A1 | 5/2007 | Lia et al. |
| 2007/0156986 A1 | 7/2007 | Neiger et al. |
| 2007/0208908 A1 | 9/2007 | Moore et al. |
| 2007/0226718 A1 | 9/2007 | Watanabe |
| 2007/0261042 A1 | 11/2007 | Chen et al. |
| 2009/0216957 A1 | 8/2009 | Chaussade et al. |

OTHER PUBLICATIONS

U.S. Appl. No. 12/125,982, filed May 23, 2008, Chen et al.
Kim, Seon W. et al., "Multiplex: Unifying Conventional and Speculative Thread-Level Parallelism on a Chip Multiprocessor", School of Electrical and Computer Engineering, Purdue University, Oct. 1, 2000, 23 pages.
USPTO U.S. Appl. No. 12/125,167.
USPTO U.S. Appl. No. 12/125,982.
Interview Summary mailed Feb. 16, 2012 for U.S. Appl. No. 12/125,982, 3 pages.
Office Action mailed Apr. 9, 2012 for U.S. Appl. No. 12/125,167, 29 pages.
Response to Office Action filed Feb. 10, 2012, U.S. Appl. No. 12/125,982, 40 pages.
Interview Summary mailed Jul. 5, 2012 for U.S. Appl. No. 12/125,167; 3 pages.
Notice of Allowance mailed May 22, 2012 for U.S. Appl. No. 12/125,982; 12 pages.
Response to Office Action filed Jul. 9, 2012, U.S. Appl. No. 12/125,167, 23 pages.
Kim et al., "Multiplex: Unifying Conventional and Speculative Thread-Level Parallelism on a Chip Multiprocessor", School of Electrical and Computer Engineering, Purdue University, 23 pages.

* cited by examiner

400

```
/* A and B are in system memory */
/* S is a scalar residing in local store */ for(i+0; i<N; i++) {
    B[i] = A[i] * S;
}
```

```
for(ii=0; ii<N; ii+=bf) {
    n = min(ii+bf, N);
    DMA get A[ii:n] to tA;
    for(i=ii; i<n; i++) {
        tB[i] = tA[i] * S;
    }
    DMA put tB to B[ii:n];
}
```

502
```
/* A[foo(i)] accessed by software cache */
for(i=0; i<N; i++) {
    A[foo(i)] = T;
}
```

504
```
/* A[i] accessed by direct buffering */
for(i=0; i<N; i++) {
    B[i] = A[i] * S;
}
```

*FIG. 5A*

```
/* A[foo(i)] accessed by software cache */
for(i=0; i<N; i++) {
    cache lookup A[foo(i)];
    if miss, DMA A[] to cache;
    A[foo(i)] = T;
}

/* A[i] accessed by direct buffering */
for(ii=0; ii<N; ii+=bf) {
    n = min(ii+bf, N);
    DMA get A[ii:n] to tA;
    for(i=ii; i<N; i++) {
        tB[i] = tA[i] * S;
    }
    DMA put tB to B[ii:n];
}
```

*FIG. 5B*

```
void foo(int * ptr1, int * ptr2) {
    ......
    for(i=0; i<N; i++) {
        ptr1[i] = ptr2[i] * S;
    }
    ......
}
```

*FIG. 6*

```
/* Before direct buffering optimization */
void bar() {
    int array[N+1];
    ......
    foo(array+1, array);
    ......           804  806  808
}
void foo(int * A, int * B) {
    ......
    for(i=0; i<N; i++) {
        A[i] = A[i] + B[i];
    }
    .......
}
    /* After direct buffering optimization */
for(ii=0; ii<N; ii+=bf) {
    int tA[N]; ~810
    int tB[N]; ~812
    n = min(ii+bf, N);
    DMA get A[i:n] to tA;
    DMA get B[ii:n] to tB;
    for(i=ii; i<n; i++) {
        tA[i] = tA[i] + tB[i];
    }
    DMA put tA to A[ii:n];
}
```

```
/* After direct buffering optimization */
for(ii=0; ii<N; ii+=bf) {
        n = min(ii+bf, N);
        direct_buffer_request(ea0, lenth0, &ptr0);
        direct_buffer_request(ea1, lenth1, &ptr1);
        direct_buffer_check_alloc();
        DMA get A[ii:n] to ptr0;
        DMA get B[ii:n] to ptr1;
        for(i=ii; i<n; i++) {
                ptr0[i] = ptr0[i] + ptr1[i];
        }
        DMA put ptr0 to A[ii:n];
}
```

```
Build quad - word arrays lb and ub for all lower and
upper bounds of buffers;
For each entry i in db_dir {            1002    1004
        For all elements k in lb and ub array {
                comp = spu_and(spu_cmpgt(ub[k], lb_i),
                                            spu_cmpgt(ub_i, lb[k]));
                result = spu_or(result, comp);
        }
        if (spu_extract(spu_gather(result), 0))
                overlapped;
        } else {
                not overlapped;
        }
}
```

```
        for(i=0; i<N; i++) {
1102 ─── A[foo(i)] = i;
                B[i] = A[i] * S;
        }
```

DYNAMICALLY MAINTAINING COHERENCY WITHIN LIVE RANGES OF DIRECT BUFFERS

BACKGROUND OF THE INVENTION

1. Field of the Invention

The present application relates generally to an improved data processing apparatus and method and more specifically to an apparatus and method for dynamically maintaining coherency within live ranges of direct buffers.

2. Background of the Invention

In heterogeneous multi-core systems, reducing hardware complexity and minimizing power consumption are important design considerations. Providing each of the accelerator cores in such systems with its own fast local memory is one means of accomplishing this goal. Typically, such systems will not provide hardware supported coherence between these local memories and the global system memory. When an application (both code and data) fit within the local memory, good performance can be guaranteed. Such a feature is critical for real time applications. The Cell Broadband Engine Architecture (CBEA) is one example of such a heterogeneous multi-core system. The CBEA includes on a chip a Power PC® processor element (PPE) core, and 8 SPE cores each with 256 KB fast local memory, as well as a globally coherent direct memory access (DMA) engine for transferring data between local memories and the shared system memory. This memory design requires careful programming to use the fast local memory efficiently and reduce long latency accesses to the global memory so as to obtain top performance.

BRIEF SUMMARY OF THE INVENTION

In one illustrative embodiment, a method, in a data processing system, is provided for reducing coherency problems in a data processing system. The illustrative embodiments receive source code that is to be compiled. The illustrative embodiments analyze the source code to identify at least one of a plurality of loops that contain a memory reference. The illustrative embodiments determine whether the memory reference is an access to a global memory that should be handled by a direct buffer. The illustrative embodiments mark the memory reference for direct buffer transformation in response to an indication that the memory reference is an access to the global memory that should be handled by the direct buffer. The illustrative embodiments apply the direct buffer transformation to the memory reference.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to, those of ordinary skill in the art in view of the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4A depicts exemplary pseudo code in accordance with an illustrative embodiment;

FIG. 4B depicts modified pseudo code after direct buffering transformation has been applied to pseudo code in accordance with an illustrative embodiment;

FIG. 5A depicts exemplary pseudo code having coherence issues between direct buffers and software controlled data cache before direct buffering and software controlled caching in accordance with an illustrative embodiment;

FIG. 5B depicts modified pseudo code having coherence issues between direct buffers and software controlled data cache after direct buffering and software controlled caching transformations have been applied in accordance with an illustrative embodiment;

FIG. 6 depicts exemplary pseudo code that is an instance where coherency issues possibly exist between direct buffers in accordance with an illustrative embodiment;

FIG. 8 depicts an exemplary loop that illustrates an instance where direct buffers inside a loop contain more than one copy of the same effective address in accordance with an illustrative embodiment;

FIG. 9 illustrates an exemplary loop transformation after the compiler transforms an original loop in accordance with an illustrative embodiment;

FIG. 10 illustrates exemplary pseudo code for an overlap detection code in accordance with an illustrative embodiment;

FIG. 11 depicts exemplary pseudo code 1100 where inside a loop an array A 1102 is first accessed irregularly (handled by software controlled data cache) then accessed regularly (optimized by direct buffering) in accordance with an illustrative embodiment;

DETAILED DESCRIPTION OF THE INVENTION

Figure 1:
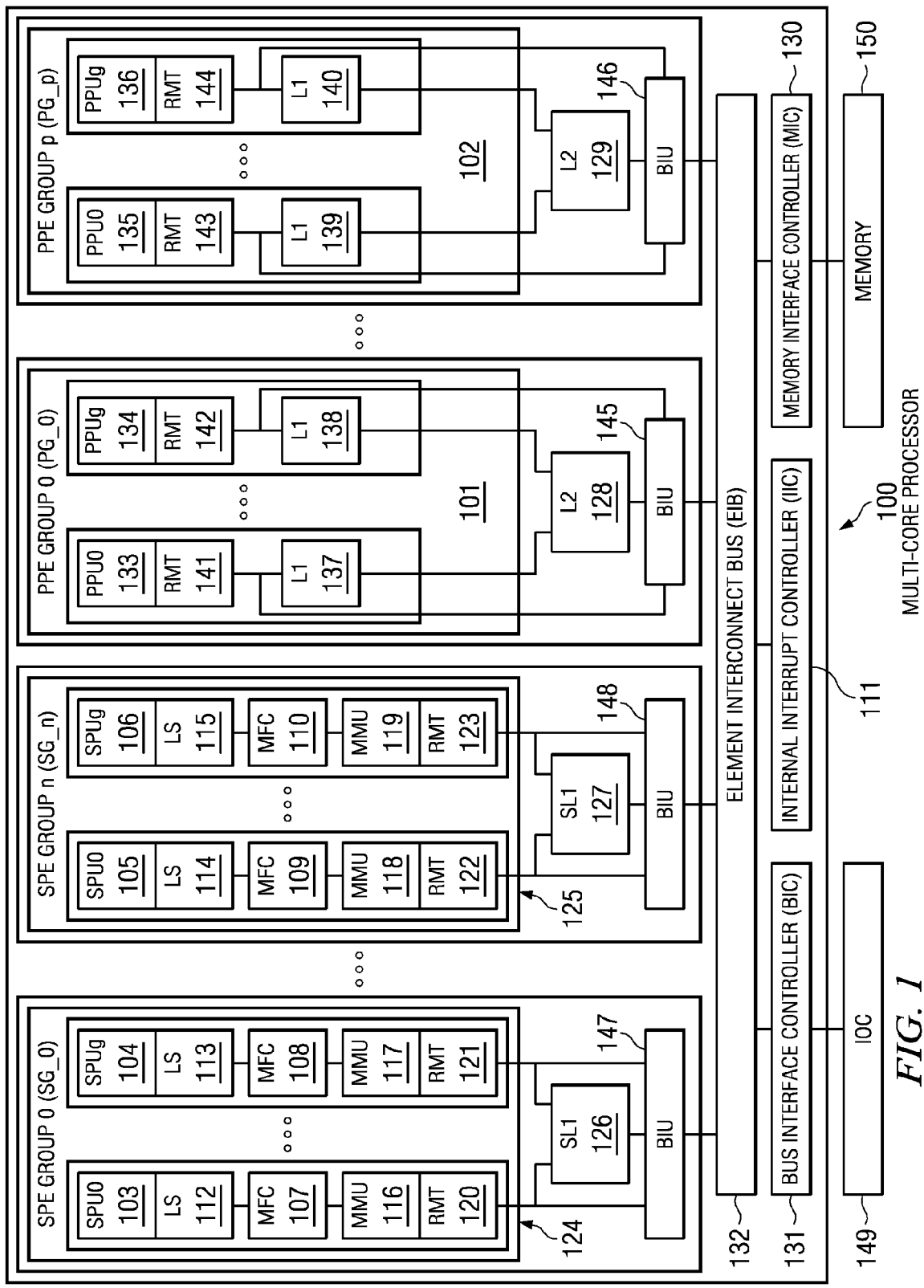
FIG. 1 depicts an exemplary diagram of a heterogeneous multi-core processor in which aspects of the illustrative embodiments may be implemented in accordance with an illustrative embodiment.

The illustrative embodiments provide a mechanism for dynamically maintaining coherency within live ranges of direct buffers, which is the range between the direct buffer's allocation and de-allocation. A direct buffer is a temporary buffer allocated in a local memory by a compiler, where data associated with data transfer operations are moved from and to global memory, which is a memory external to a processor. That is, both software controlled caching and direct buffering are applied to executed applications. For some applications, there may be data references copied from a main memory that are suitable for software controlled cache while other data reference may be handled more efficiently by direct buffering. By using direct buffering techniques only on regular data references, those data references that may be placed into direct buffers, and software controlled caching as a fall-back solution for irregular data references, those data references that may not be placed into direct buffers, data coherence problems may exist between the cache line and the local buffers allocated for use by direct buffering. Thus, the illustrative embodiments provide for updating local memory and global memory so that any copies of a specific piece of global memory data that has been previously copied to a software controlled cache or one or more direct buffers is updated when the data changes in any one location where a copy of the global memory data reside. Thereby, any subsequent read of the data will be the most up to date data.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems), and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code; which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments provide a mechanism for dynamically maintaining coherency within live ranges of direct buffers. Thus, the illustrative embodiments may be utilized in many different types of data processing environments including a distributed data processing environment, a single data processing device, or the like. In order to provide a context for the description of the specific elements and functionality of the illustrative embodiments. FIG. 1 is provided hereafter as exemplary environments in which exemplary aspects of the illustrative embodiments may be implemented. While the description following FIG. 1 will focus primarily on a single data processing device implementation for dynamically maintaining coherency within a live range of direct buffers, this is only exemplary and is not intended to state or imply any limitation with regard to the features of the present invention. To the contrary, the illustrative embodiments are intended to include distributed data processing environments and embodiments in which coherency within a live range of direct buffers is dynamically maintained.

With reference now to the figures and in particular with reference to FIG. 1, exemplary diagrams of data processing environments are provided in which illustrative embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

With reference now to the figures and in particular with reference to FIG. 1, an exemplary diagram of a heterogeneous multi-core processor is shown in which aspects of the illustrative embodiments may be implemented in accordance with an illustrative embodiment. This example of a heterogeneous multi-core processor is compliant with the Cell Broadband Engine™ architecture jointly developed by IBM, Sony Computer Entertainment Inc., and Toshiba. Cell Broadband Engine is a trademark of Sony Computer Entertainment Corporation. Multi-core processor 100 may consist of a single chip, a multi-chip module (or modules), or multiple single-chip modules on a motherboard or other second-level package, depending on the technology used and the cost/performance characteristics of the intended design point directed toward distributed processing targeted for media-rich applications such as game consoles, desktop systems, and servers.

Logically, multi-core processor 100 defines four separate types of functional components: Power PC® processor element (PPE) 101 or 102, synergistic processor units (SPU) 103, 104, 105, or 106, memory flow controller (MFC) 107, 108, 109, or 110, and internal interrupt controller (IIC) 111. The computational units in multi-core processor 100 are PPEs 101 and 102 and SPUs 103, 104, 105, and 106. Each of SPUs 103, 104, 105, and 106 has dedicated local storage (LS) 112, 113, 114, or 115, a dedicated MFC 107, 108, 109, or 110 with its associated memory management unit (MMU) 116, 117, 118, or 119, and replacement management table (PMT) 120, 121, 122, or 123, respectively. The combination of these components is referred to as SPU element (SPE) group 124 or 125.

Multi-core processor 100 depicts SPE groups 124 and 125 that share a single SL1 cache 126 and 127, respectively. An SL1 cache is a first-level cache for direct memory access transfers between local storage and main storage. PPE groups 101 and 102 share single second-level (L2) caches 128 and 129, respectively. While caches are shown for the SPE groups 124 and 125 and PPE groups 101 and 102, they are considered optional in the Cell Broadband Engine Architecture (CBEA). Also included in FIG. 1 are two controllers typically found in a processor: memory interface controller (MIC) 130 and bus interface controller (BIC) 131. MIC 130 provides access to memory 150 for multi-core processor 100. BIC 131 provides an input/output interface to input/output controller (IOC) 149 for multi-core processor 100. Memory 150 and IOC 149 are external to multi-core processor 100. Connecting the various units within the processor is element interconnect bus (EIB) 132.

Multi-core processor 100 may include multiple groups of Power PC® processor elements (PPE groups), such as PPE group 101 or 102, and multiple groups of synergistic processor elements (SPE groups), such as SPE group 124 or 125. Hardware resources may be shared between units within a group. However, SPE groups 124 and 125 and PPE groups 101 and 102 appears to software as independent elements.

Each of SPUs 103, 104, 105, and 106 in SPE groups 124 and 125 has its own local storage area 112, 113, 114, or 115 and dedicated MFC 107, 108, 109, or 110 that includes an associated MMU 116, 117, 118, or 119, which can hold and process memory-protection and access-permission information.

Multi-core processor 100 includes one or more of PPE group 101 or 102. PPE groups 101 and 102 consist of 64-bit Power PC® processor units (PPUs) 133, 134, 135, and 136 with associated L1 caches 137, 138, 139, and 140, respectively. Multi-core processor 100 system includes a vector multimedia extension unit (not shown) in the PPE groups 101 and 102. PPE groups 101 and 102 also contain replacement management table (RMT) 141, 142, 143, and 144 and bus interface unit (BIU) 145 and 146, respectively. BIUs 145 and 146 connect PPE groups 101 or 102 to the EIB 132. BIUs 147 and 148 connect RMTs 120, 121, 122, and 123 to EIB 132.

PPE groups 101 and 102 are general-purpose processing units, which can access system management resources, such as the memory-protection tables, for example. Hardware resources defined in the CBEA are mapped explicitly to the real address space as seen by PPE groups 101 and 102. Therefore, any PPE groups 101 and 102 may address any of these resources directly by using an appropriate effective address value. A primary function of PPE groups 101 and 102 is the management and allocation of tasks for the SPE groups 124 and 125 in a system.

Multi-core processor 100 includes one or more SPUs 103, 104, 105, or 106. SPUs 103, 104, 105, and 106 are less complex computational units than PPE groups 101 and 102, in that they do not perform any system management functions. SPUs 103, 104, 105, and 106 have a single instruction multiple data (SIMD) capability and typically process data and initiate any required data transfers, subject to access properties set up by PPE groups 101 and 102, in order to perform their allocated tasks.

MFCs 107, 108, 109, and 110 are essentially the data transfer engines. MFCs 107, 108, 109, and 110 provide the primary method for data transfer, protection, and synchronization between memory 150 and the local storage areas 112, 113, 114, or 115. MFCs 107, 108, 109, and 110 commands describe the transfer to be performed. A principal architectural objective of MFCs 107, 108, 109, and 110 is to perform these data transfer operations in as fast and as fair a manner as possible, thereby maximizing the overall throughput of multi-core processor 100.

Commands that transfer data are referred to as MFC direct memory access commands. These commands are converted into direct memory access transfers between the local storage domain, such as local storage areas 112, 113, 114, or 115, and main storage domain, such as memory 150. Each of MFCs 107, 108, 109, and 110 may typically support multiple direct memory access transfers at the same time and may maintain and process multiple MFC DMA commands.

In order to accomplish this, MFCs 107, 108, 109, and 10 maintain and process queues of MFC DMA commands. Each of MFCs 107, 108, 109, and 10 provide one queue for the associated SPU 103, 104, 105, or 106, MFC SPU command queue, and one queue for other processors and devices, MFC proxy command queue. Logically, a set of MFC queues is always associated with each SPU 103, 104, 105, or 106 in multi-core processor 100, but some implementations of the architecture may share a single physical MFC between multiple SPUs. In such cases, all the MFC facilities appear to software as independent for each SPU 103, 104, 105, or 106.

Each MFC direct memory access data transfer command request involves both a local storage address (LSA) and an effective address (EA). The local storage address can directly address only the local storage area of its associated SPU 103, 104, 105, or 106. The effective address has a more general application, in that it can reference main storage, including all the SPU local storage areas, if they are aliased into the real address space.

MFCs 107, 108, 109, and 110 present two types of interfaces: one to the SPUs 103, 104, 105, and 106 and another to all other processors and devices in a processing group.

SPU channel: The SPUs 103, 104, 105, and 106 use a channel interface to control MFCs 107, 108, 109, and 110. In this case, code running on SPUs 103, 104, 105, and 106 can only access the MFC SPU command queue for that SPU 103, 104, 105, or 106.

Memory-Mapped Register: Other processors and devices control MFC 107, 108, 109, and 110 by using memory-mapped registers. It is possible for any processor and device in the system to control MFCs 107, 108, 109, or 110 and to issue MFC proxy command requests on behalf of SPU 103, 104, 105, or 106.

MFCs 107, 108, 109, and 110 also support bandwidth reservation and data synchronization features.

IIC 111 manages the priority of the interrupts presented to PPE groups 101 and 102. The main purpose of IIC 111 is to allow interrupts from the other components, such as SPE groups 124 and 125, in multi-core processor 100 to be handled without using the main system interrupt controller, which is not shown but is part of the data processing system in which multi-core processor 100 is used. IIC 111 is really a second level controller. IIC 111 is intended to handle all interrupts internal to a multi-core processor 100 or within a multiprocessor system of multi-core processor 100. The main system interrupt controller will typically handle all interrupts external to multi-core processor 100.

In a multi-core system, software checks IIC 222 to determine if the interrupt was sourced from the main system interrupt controller. IIC 111 is not intended to replace the main system interrupt controller for handling interrupts from all I/O devices.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than a symmetric multiprocessing (SMP) system, without departing from the spirit and scope of the present invention.

With the Cell Broadband Engine Architecture (CBEA) described above as an exemplary data processing environment, the illustrative embodiments make use of a compiler, which may be executed on PPE group 101 or 102, for example, or another platform, to compile source code for execution on PPE group 101 or 102 and, optionally, one or more of SPE group 124 or 125. As part of the compilation of the source code, the compiler identifies data variables that are explicitly fetchable and data variables that are not. The explicitly fetchable data variables are checked to ensure that they do not have any aliases to non-explicitly fetchable data variables. Those explicitly fetchable data variables that do not have any alias to non-explicitly fetchable data variables are excluded, by the compiler, from being accessed via the software cache or direct buffer of SPE group 124 or 125. Those data variables that have aliases are not permitted by the compiler to be explicitly fetched and instead, are accessed via the software cache or direct buffer. In the CBEA, the resulting compiled code is partitioned for execution on PPE group 101 or 102 and SPE group 124 or 125. At runtime, the master thread resides on PPE group 101 or 102 and threads on the SPE group 124 or 125 are forked when needed.

In one illustrative embodiment, SPE group 124 or 125 makes use of software caches and/or direct buffers, that are created in local storage areas 112, 113, 114, or 115, to access data stored in memory 150, which may be referred to as global memory, that may be accessed by all components of a data processing system that requires data storage. Global memory, which is shared by all processor and processor cores, is memory that has the same global view, meaning that the address space is the same for all processors and processor cores. On the other hand, local memory is memory that is associated only with the processor or processor core to which the local memory is attached. This is an example implementation in which the software caches and direct buffers are utilized to access a shared memory. However, it should be appreciated that the same mechanisms of the illustrative embodiments may be utilized in implementations where a distributed memory is accessed via the software cache.

Generally, there are two common strategies to manage the local memory to run programs with large data sets: software controlled caching and direct buffering. In software controlled cache, a portion of the local memory is allocated for cache lines. Every load/store to global memory is instrumented with cache related instructions to go through software controlled cache lookup operations and miss handling (if needed) at runtime. A software controlled cache may be able to handle all data references uniformly through the cache and capture any data reuse that occurs. However, using a software controlled cache is typically an expensive approach, and in practice software controlled caches require additional techniques in order to provide reasonable performance.

In direct buffering, a compiler allocates temporary buffers data in the local memory and inserts data transfer operations to move data between the local buffer and global memory. Each load/store to global memory is then replaced with the direct load/store to the buffer at compile time. As a result, both the software controlled cache lookup and miss handling cost may be eliminated. The size of DMA transfer chunks may be adapted to the application instead of being determined by the fixed cache line length. Direct buffering is usually combined with loop strip mining to limit the size of the local buffer required. Since the mapping of data references between global memory and local buffers is done statically, direct buffering is only applicable on data references with known dependences, such as those with regular data accesses in loop nests with clear aliasing and data dependence information. Unclear aliasing or data dependences present difficulties for direct buffering techniques, such that reuse opportunities may be lost. The worst case for direct buffering is that a buffer is allocated, used for only one data reference, and then freed. In this case, opportunities may be lost for both temporal and spatial data reuse.

Thus, it may be desirable to apply both software controlled cache and direct buffering as appropriate, especially on large complicated applications. Some known approaches select either software controlled cache or direct buffering, based on the characteristics of the applications. But for a large application, some data references may be suitable for software controlled cache while the others may be handled more efficiently by direct buffering. From a compiler implementation point of view, the compiler developer may target the direct buffering techniques only on regular data references and use software controlled cache as the fall-back solution for irregular data references. However, the integration of software controlled cache and direct buffering may create data coherence problems between the cache line and the local buffers allocated for use by direct buffering, because the same data in the global memory may have two copies in the local memory. If one copy is modified, the other will have to be updated properly.

Figure 2:
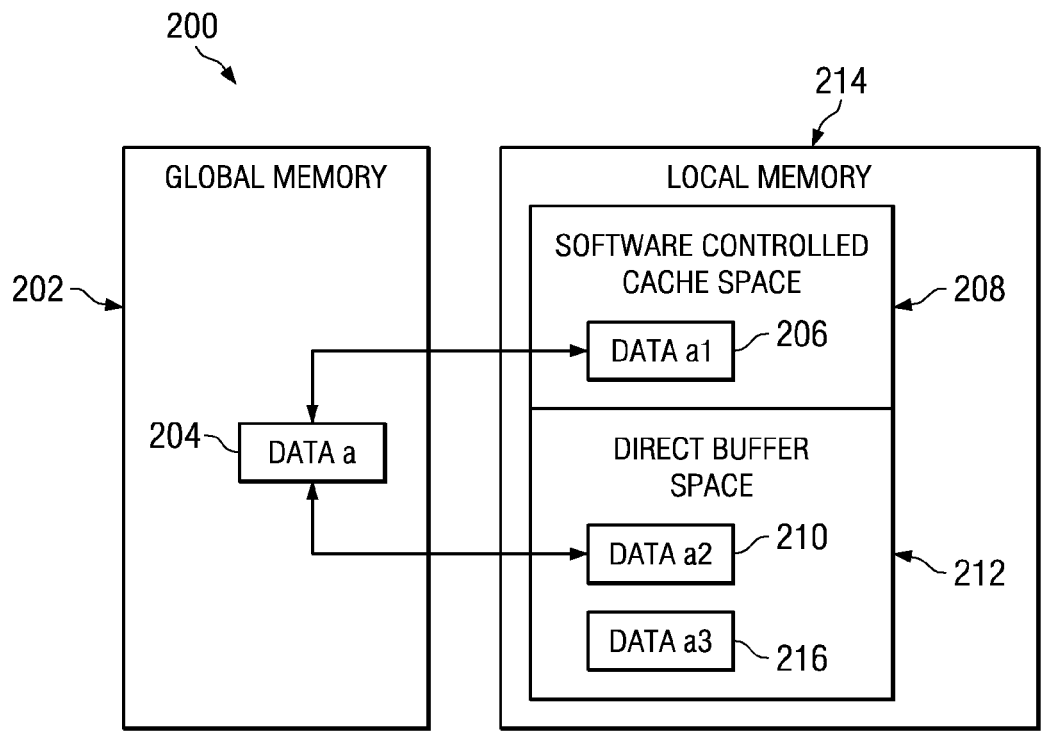
FIG. 2 depicts an exemplary data transfer diagram in accordance with an illustrative embodiment.

FIG. 2 depicts an exemplary data transfer diagram in accordance with an illustrative embodiment. In data transfer 200, global memory 202 contains data a 204. Also in data transfer 200, data a 204 has three copies: data a1 206 in software controlled cache space 208 and data a2 210 and data a3 216 in direct buffer space 212. In data transfer 200, both software controlled cache space 208 and direct buffer space 212 are located within local memory 214. If, for example data a1 206 in software controlled cache space 208, is modified, then the data a2 210 in direct buffer space 212 would contain an obsolete value. Further, if a read of data a2 210 were requested, then the read of data a2 210 would return an incorrect result. Thus, in this example, a coherency problem exists between the two copies of data, data a1 206 and data a2 210, within local memory 214 of a single thread. In this example, coherence problem exists between software controlled cache space 208 and direct buffer space 210; however, the same problem may also exist between direct buffers within direct buffer space 212. For example, when data a2 210 in one direct buffer inside direct buffer space 212 is modified, then data a3 216 in another direct buffer inside direct buffer space 212 would contain an obsolete value. Further, if a read of data a3 216 were requested, then the read of data a3 216 would return an incorrect result. This coherency problem is orthogonal to the coherence issues among different threads.

The illustrative embodiments provide mechanisms to eliminate coherency problems using runtime coherency maintenance without having to rely on compiler analysis. Previous known approaches use compiler analysis to guarantee that there is no coherence problem within the live range of direct buffers, and rely on runtime support to update values from or to software controlled data cache at the boundary of a direct buffer live range. However, due to limitations of compiler analysis the compiler may fail to guarantee that there is no coherence problem due to imprecise alias information between the data reference within global memory and local memory and/or poor memory disambiguation within the memories. By using a pure runtime coherence maintenance scheme, the illustrative embodiment exploits direct buffering optimization opportunities that are previously given up by the compiler. The illustrative embodiments may be implemented in a single source compiler for a Cell broadband engine architecture (CBEA), such as multi-core processor 100 in FIG. 1.

The primary advantage of the illustrative embodiments is to enable direct buffering optimizations for program loops previously not optimized due to limitations of compiler analysis. When compiler analysis fails to optimize a loop, the illustrative embodiments explore direct buffering optimizations maximally. The illustrative embodiments maintain coherence between software controlled data cache and direct buffers at runtime by guaranteeing that for any global data, that all copies within the software controlled cache and one or more direct buffers are the same.

Figure 3:
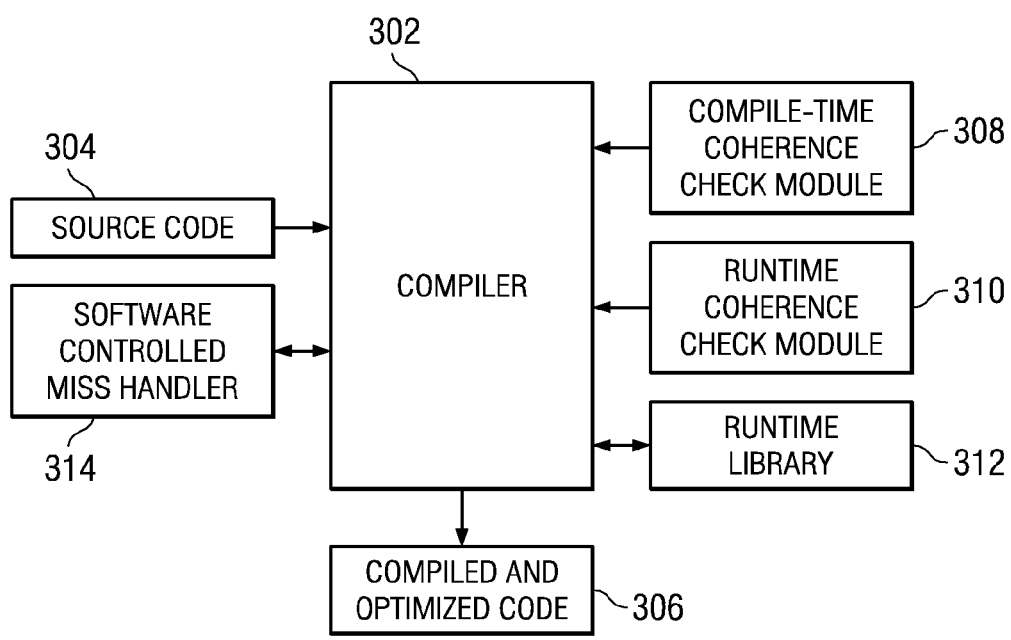
FIG. 3 depicts an exemplary operation of a compiler that compiles data used by an application in accordance with an illustrative embodiment.

FIG. 3 depicts an exemplary operation of a compiler that compiles data used by an application in accordance with an illustrative embodiment. A compiler is a computer program that translates a series of statements written for one application program in one computer language, commonly called source code, into a resulting output in another computer language, commonly called the object or target code. Extracting performance from heterogeneous processors, such as multi-core processor 100 in FIG. 1, presents a number of challenges for the average and even sometimes experienced programmers. To ease the programming for the Cell Broadband Engine. Architecture (CBEA), a single source compiler, such as compiler 302, takes advantage of the architectural complexity of the heterogeneous processor and improves performance. Compiler 302 receives source code 304 that may include one or more source files with a shared memory programming model. Using compiling instructions from the application programmer included with source code 304, compiler 302 outlines parallelizable code sections into separate functions and compiles source code 304 to provide compiled and optimized code 306 for one or more processing elements in the computing system. Compiler 302 may also prepare for data transfers between global memory and local memory associated with the processing element that is executing the application, such as PPE group 101 or 102 or SPE group 124 or 125 of FIG. 1. That is, complier 302 may identify accesses in processing element functions that refer to data in global memory locations and use either software controlled cache or direct buffering to manage the data transfers. Complier 302 may also manage code size by partitioning source code 304 into manageable chunks and using code overlay support to transfer code at runtime.

Software controlled cache is the basic mechanism for data management in complier 302. Software controlled cache works in a similar way to a hardware data cache, but is implemented by compiler transformations. Compiler 302 replaces loads and stores to global memory in the processing element code with instructions that explicitly look up the effective address in the directory of the software controlled cache. If a cache line for the effective address is found in the directory, which may also be referred to as a cache hit, compiler 302 uses the value in the software controlled cache. Otherwise, if a cache line for the effective address is not found in the directory, which may be referred to as a cache miss, compiler 302 allocates a line in the cache either by using an empty line or by replacing an existing one. Then, for a load, compiler 302 issues a DMA get operation to read the data from global memory to the cache line. For stores, compiler 302 writes the data to the cache and maintains dirty bits to record which bytes are actually modified. Later, compiler 302 merges the modified data back to global memory using atomic update operations, either when the cache line is evicted to make space for other data or when a cache flush is invoked in the code based on semantics.

Software controlled cache is expensive and incurs significant runtime overhead due to the cache lookup and miss handling cost. Some data references are regular data references from the point-of-view of compiler optimizations. These regular data references occur within a loop, where the memory addresses that the regular data references refer to may be expressed using affine expressions of loop induction variables. An affine expression in loop nest $(i_1, i_2, \ldots, i_n)$ is in the following form: $a_1*i_1+a_2*i_2+\ldots+a_n*i_n+C$, where $a_1, a_2$ to $a_n$ are integer constant, and C is a loop invariant expression. A loop invariant expression is an expression in which all the operands are constants or variables whose value will not change in the loop. For such regular accesses to shared data, the illustrative embodiments avoid using software controlled cache and apply direct buffering. Direct buffering allocates temporary local buffers in local memory for the regularly accessed data. For read data references, compiler 302 initializes the buffer with a DMA get operation before the loop executes. For write data references, compiler 302 writes out the data from the buffer using a DMA put operation after the loop finishes execution. Compiler 302 statically generates these DMA get and DMA put operations.

Compiler 302 also transforms the loop body so that the processing element accesses the local buffer directly without incurring any software controlled cache overhead. Furthermore, DMA operations may be overlapped with computations by using multiple local buffers. That is, it is more efficient to transfer a longer stream of data by DMA. However, longer DMA requires larger size of buffer. A buffer scheme employed by compiler 302 may contain a single-buffer, double buffers, or a number k of buffers (k-buffers). In the single buffer scheme, the DMA operations have to be finished and then computation may start. In the double buffer scheme, a DMA read, for example, will be issued one iteration ahead of the computation start. In detail, a DMA read for iteration i will be issued at the beginning of iteration i−1. As a result, a DMA read for iteration i may be overlapped with computation in iteration i−1. In a k-buffer scheme the DMA read operation may be issued k−1 iteration ahead of the computation start. Compiler 302 may choose the proper buffering scheme and buffer size to optimize execution time and space by analyzing the available memory resources of the data processing system and by computing a computation-to-communication ratio for the loop that is being analyzed. The computation portion of the ratio is based on the total number of operations that are being performed with the loop and the communication portion of the ratio is based on the number of DMA operations that will be performed within the loop.

Known approaches use compiler analysis to guarantee that for the loop to be optimized by direct buffering there are no coherence problems within the live range of direct buffers and use runtime checking to maintain coherency at the boundary of direct buffer live ranges. These known approaches may fail to guarantee that there are no coherence problems within the live range of direct buffers for the loop due to limitations of compiler analysis. In those cases, known approaches give up optimizing the loop by direct buffering and, in many cases, compilers fail to achieve the guarantee not due to real dependences but due to imprecise alias information and poor memory disambiguation. However, direct buffering has significant performance advantage handling regular data references. Thus, the illustrative embodiments provide for dynamically maintaining coherence within the live range of direct buffers thus exploiting more direct buffering opportunities than known approaches.

FIG. 4A depicts exemplary pseudo code 400 in accordance with an illustrative embodiment. FIG. 4B depicts modified pseudo code 402 after direct buffering transformation has been applied to pseudo code 400 in accordance with an illustrative embodiment. Modified pseudo code 402 illustrates that direct buffering first tiles the loop to partition the loop iteration space into smaller blocks and limits the size of local buffer required, then inserts proper DMA operations, and at last transforms data references inside the loop body to local buffers.

Both direct buffering and software controlled caching have pros and cons, and, thus, the application of direct buffering and software controlled caching may best be considered on a reference by reference basis. Therefore, compiler 302 in FIG. 3 may optimize some data references to a variable at a certain point in the program by direct buffering while other data references to the same variable may be optimized by software controlled caching. Thus, a data coherence problem may occur, i.e., the same data could reside in both local buffers created by direct buffering and software controlled caching. The coherence between software controlled cache and local buffers has to be maintained to ensure correctness.

FIG. 5A depicts exemplary pseudo code 500 having coherence issues between direct buffers and software controlled data cache before direct buffering and software controlled caching in accordance with an illustrative embodiment. In loop 502, the access to array A is irregular; thus, array A may be accessed through software controlled cache. In loop 504, the access to array A is regular; thus, array A may be accessed using direct buffering.

FIG. 5B depicts modified pseudo code 506 having coherence issues between direct buffers and software controlled data cache after direct buffering and software controlled caching transformations have been applied in accordance with an illustrative embodiment. After the execution of loop 508, some elements of array A may have been modified in software controlled cache and not evicted to global memory yet. During the execution of loop 510, when direct buffering attempts to access array A from global memory using DMA operations, direct buffering may result in the access of stale values from the global memory. A similar problem may occur when direct buffering writes data back to the global memory. If the same data already exists in the software controlled cache, DMA write operations from the direct buffer to the global memory may not update the stale values in the software controlled cache. If the application accesses the data through the software controlled cache, the application may result in accessing obsolete values.

Returning to FIG. 3, the illustrative embodiments combine compiler analysis and runtime coherence maintenance. Compiler 302 uses compile-time coherence check module 308 and runtime coherence check module 310 to perform compiler analysis and runtime coherence maintenance, respectively. Instead of making a conservative decision in the global scope based only on compiler analysis, compiler 302 applies direct buffering in the unit of a loop nest and decides on whether to optimize each of the data references to global memory within the loop nest. Compiler 302 relies on runtime coherency check module 310 to solve potential coherence issues and ensure correctness of the program.

When compiler 302 receives source code 304, compiler 302 analyzes the memory references within the innermost normalized loops in source code 304. For each memory reference, compiler 302 identifies whether the memory reference is an access to global data that should be optimized by direct buffering. If the memory reference should be optimized by direct buffering, compiler 302 applies a direct buffer transformation for the memory reference as described above. Then compile-time coherence check module 308 checks whether it can guarantee that there are no coherence problems within the live range of direct buffers. If compile-time coherence check module 308 succeeds in doing that, previous known approaches are applied so that coherence maintenance is only done at the boundary of direct buffer live range to reduce runtime overhead. If compile-time coherence check module 308 fails to achieve the guarantee, compiler 302 will rely on runtime coherence check module 310 to maintain coherence within live range of direct buffers at runtime. There are two kinds of potential coherence problems within the live range of direct buffers. The first is a coherence problem between software controlled data cache and direct buffers. The second is a coherence problem between different direct buffers. Both problems are handled by runtime coherence check module 310 with interactions with software controlled data cache management code and direct buffer management code respectively.

This following description will discuss one example of a solution that solves the coherence problem between direct buffers. FIG. 6 depicts exemplary pseudo code 600 that is an instance where coherency issues possibly exist between direct buffers in accordance with an illustrative embodiment. In pseudo code 600, ptr1 602 and ptr2 604 are two pointers passed into a procedure. Inside the procedure, ptr1 602 and ptr2 604 are used to access global memory regularly. Ideally, those accesses performed by ptr1 602 and ptr2 604 should be optimized by direct buffering. However, direct buffers are allocated statically at compile time in known approaches and direct buffering transformation will create two local buffers for accesses through ptr1 602 and accesses through ptr2 604, respectively. Before applying such direct buffering transformations, the compiler ensures that accesses through ptr1 602 and accesses through ptr2 604 do not overlap at all, otherwise some data will have two copies in local memory and coherence problems will exist.

Returning to FIG. 3, in order to address these types of coherence problems, known compilers, such as compiler 302, build a data dependence graph for all data references inside the loop nest to be optimized. For each data reference, compiler 302 attempts to optimize source code 304 using direct buffering by checking whether there is any dependence between the direct buffer used by this data reference and any other direct buffers and checking whether there is any dependence between this data reference and a software controlled cache data reference in the scope of the loop. Only when compiler 302 guarantees that there is no such dependence, will compiler 302 continue direct buffering transformation for the data reference. Otherwise, compiler 302 will give up any attempt at direct buffering and use software controlled cache for the data reference.

However, in many cases, compiler 302 fails to achieve the guarantee not due to real dependences but due to imprecise alias information and poor memory disambiguation. Thus, opportunities of direct buffering are missed and full performance potential may not be achieved. Thus, the illustrative embodiments provide for dynamically detecting direct buffering coherence problems and maintaining coherence inside the loop nest. In the illustrative embodiments, compiler 302 may apply direct buffering on any data reference compiler 302 regards as beneficial without constraint by coherence issues.

Figure 7:
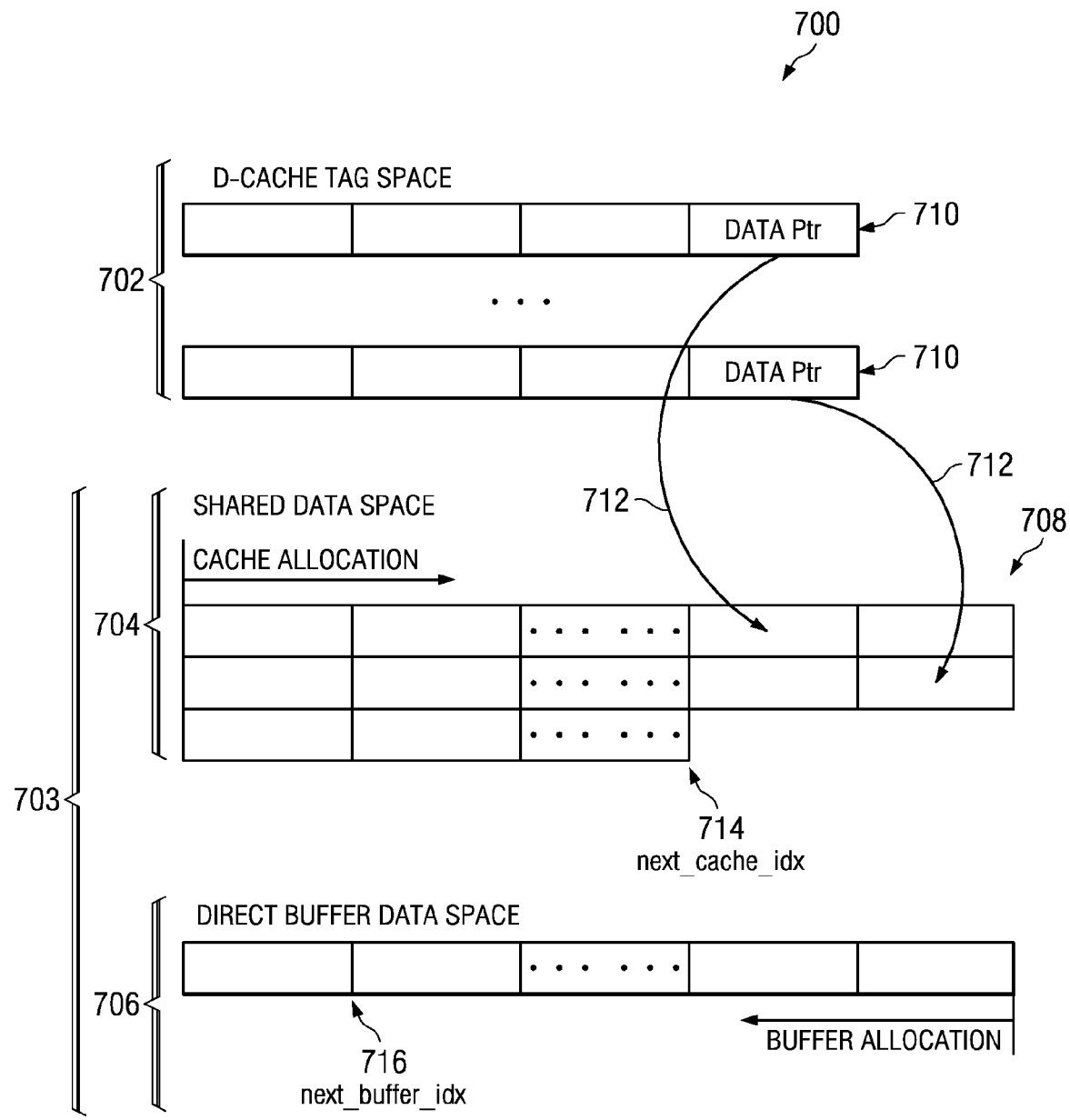
FIG. 7 illustrates local data space management in accordance with an illustrative embodiment.

FIG. 7 illustrates local data space management in accordance with an illustrative embodiment. Local data space 700 comprises two major segments: software data cache (D-cache) tag space 702 and data space 703 shared by software controlled data cache data space 704 and direct buffer data space 706. Software controlled data cache data space 704 and direct buffer data space 706 share data space 703 in order to provide more efficient space utilization.

Software controlled data cache data space 704 may contain blocks of cache line size 708. Each cache line tag 710 within software D-cache tag space 702 contains data pointer 712 pointing to the data space for the cache line in software controlled data cache data space 704. Two variables, next_cache_idx 714 and next_buffer_idx 716, mark the end of software controlled data cache data space 704 and direct buffer data space 706, respectively. When software controlled data cache data space 704 needs a new cache line, a runtime library, such as runtime library 312 of FIG. 3, allocates the new cache line from the beginning of the shared data space by bumping forward next_cache_idx 714. On the other hand, when direct buffer data space 706 needs new space, the runtime library allocates the new space form the end of the shared data space by bumping backward next_buffer_idx 716. When next_cache_idx 714 and next_buffer_idx 716 meet, the runtime library recognizes that there is not enough free space left in local data space 700 and software D-cache tag space 702 will be flushed by the runtime library to make more space in local data space 700.

By releasing the compiler from the burden of guaranteeing there is no coherence problem between direct buffers for a loop nest, direct buffers for a loop nest may then contain more than one copy of the same effective address (EA). FIG. 8 depicts exemplary loop 800 that illustrates an instance where direct buffers inside a loop contain more than one copy of the same effective address in accordance with an illustrative embodiment. Within loop 800 inside function foo 804, the compiler identifies accesses through pointer A 806 and pointer B 808 as regular and that pointer A 806 and pointer B 808 should be optimized by direct buffering to improve performance. However, the compiler may not be able to tell the exact relation between pointer A 806 and pointer B 808 at compile time and may not be sure whether there is dependence between accesses through pointer A 806 and accesses through pointer B 808. In loop 800, there is indeed dependence between access through pointer A 806 and access through pointer B 808. In known coherency checking approaches, the direct buffers for accesses through pointer A 806 and accesses through pointer B 808 may be statically allocated by the compiler as tA 810 and tB 812 as shown pseudo code 800. If there is real dependence such as in loop 800, such compiler transformation may create coherence problems since the same data in global memory space will reside in both tA 810 and tB 812 locally. Known coherency checking avoids these kind of coherency problems by simply acting conservatively and forfeiting direct buffering optimizations for accesses through both pointer A 806 and pointer B 808.

To eliminate coherence problems between direct buffers as shown above, the illustrative embodiments ensure that for any global memory data there is only one copy of the data in local memory. Thus, the illustrative embodiments allocate direct buffers properly so that there is only one copy of any global memory data among all local buffers used by direct buffering. At compile time, an overlap of direct buffer allocation in terms of global memory address space may not be known. In order to allocate direct buffers properly, buffer allocation is postponed to runtime.

Returning to FIG. 3, instead of creating static buffers during compilation, compiler 302 generates a buffer allocation request with proper information to runtime library 312. For each direct buffer, compiler 302 generates a call, direct_buffer_request, to runtime library 312 to request a chunk of local space. Runtime library 312 records each buffer allocation request for later analysis. Runtime library 312 may use a buffer directory data structure in which runtime library 312 saves information for each direct buffer, such as the direct buffers effective address (EA) space address, length and local space address, or the like. Each direct_buffer_request from compiler 302 simply allocates and initializes a new entry in the buffer directory. FIG. 9 illustrates an exemplary loop transformation 900 after the compiler transforms the same original loop, such as loop 800 of FIG. 8, in accordance with an illustrative embodiment.

After all direct buffer allocation requests are issued, compiler 302 generates a call, direct_buffer_check_alloc, to inform runtime library 312 to check coherence problem between buffers and allocate direct buffers properly. After runtime library 312 gathers access ranges of all direct buffering for the loop nest, runtime library 312 performs a fast check to determine whether any of the access ranges overlap with each other, which is the rare case. The overlapping detection step always incurs whenever compiler 302 cannot guarantee there is no coherence problem between buffers at compile time, so the overlapping detection is implemented very efficiently to reduce runtime overhead. The direct_buffer_check_alloc function detects any overlap in the access ranges of the direct buffer allocation requests. Runtime library 312 performs the detection of any overlapping conditions regardless of whether or not actual overlapping exists and in such a way so as to reduce runtime overhead. The implementation of the overlap detection may require that the code be machine specific.

FIG. 10 illustrates exemplary pseudo code 1000 for overlap detection code in accordance with an illustrative embodiment. In pseudo code 1000, lower bound (lb) 1002 and upper bound (ub) 1004 are used to define the access range of a direct buffer. Two quad-word arrays are built to collect lower bounds and upper bounds of all direct buffer requests to facilitate simdization. In the pseudo code, the illustrative embodiments check for overlapping outside of the innermost loop to avoid introducing hard to predict branches inside the innermost loop. By checking for overlapping outside the innermost loop, performance may be increased since the processing elements do not require hardware branch prediction, there is little or no overlapping, and the total number of direct buffer requests is usually small.

Returning to FIG. 3, if runtime library 312 identifies access ranges that overlap, runtime library 312 groups the overlapping ranges into access groups until none of the access groups overlaps with each other. After access range overlap detection, if there is actually no coherence problem between direct buffers, runtime library 312 allocates contiguous space for each direct buffer recorded in the buffer directory. If there is overlapping in access ranges, runtime library 312 ensures that there is only one copy for the overlapped portion. To ensure that there is only one copy for the overlapped portion, runtime library 312 groups overlapping direct buffers until grouped buffers do not overlap each other any more. To group two overlapping direct buffers (lb1, ub1) and (lb2, ub2), runtime library 312 creates a direct buffer group [min(lb1, lb2), max (ub1, ub2)]. The created direct buffer group may be further grouped with other direct buffers so that the grouping performed by runtime library 312 is an iterative process and buffer groups may construct a multi-level hierarchy. If a direct buffer does not overlap with other buffers, that direct buffer is considered to be a top-level buffer group itself. After buffer grouping is done, direct_buffer_check_alloc function may allocate a contiguous local space for each buffer group and return a local space pointer properly adjusted by the offset of the direct buffer in the buffer group.

Using this method, whenever two direct buffers overlap a portion of their access ranges, the direct buffers will share the same local buffer space for the overlapped portion, so there will be no coherence problems between different direct buffers. Again, the above scheme guarantees that, if different direct buffers access the same global memory location, those direct buffers will share the local space for the global memory location and only one copy of the global data will present in local memory, thus coherence problem between direct buffers is eliminated.

In addition to ensuring coherence between different direct buffers, coherency may also be maintained between software controlled data cache and direct buffers within a loop. FIG. 11 depicts exemplary pseudo code 1100 where inside a loop an array A 1102 is first accessed irregularly (handled by software controlled data cache) then accessed regularly (optimized by direct buffering) in accordance with an illustrative embodiment. While direct buffering may not handle irregular accesses, regular accesses to global memory data may be optimized by direct buffering. Because a software controlled cache may manage data in the unit of a cache line, the illustrative embodiments extend all direct buffer allocation requests to cache lines aligned in terms of both starting address and length. Thus, eliminating partial cache lines residing in local buffers created by direct buffering.

Returning to FIG. 3, in order to maintain coherency between software controlled data cache and direct buffers within a loop, compiler 302 and runtime library 312 ensure that all coherency requirements are satisfied when direct buffers are allocated and initialized, maintain coherency during the execution of the loop body, and maintain coherency when direct buffers are freed. In the illustrative embodiments, when a direct buffer is allocated and initialized, runtime library 312 updates the direct buffer with the latest value in software D-cache and, in addition, modifies the data pointer of the software D-cache line to point to the proper location in the newly allocated direct buffer so that there is only one copy of the global data in local memory.

During the execution of the loop body, to make sure there is only one copy of global data in local memory, whenever there is a software controlled cache miss, runtime library 312 checks whether the missing global memory address hits in the direct buffer directory. If the missing global data line is not in one or more local direct buffers, software controlled cache miss handler 314 works normally. However, if the missing line currently resides in one of the local direct buffers, the software controlled cache miss handler 314 does not need to do a DMA transfer to get the missing data line since the up-to-date data line is already in local memory. Software controlled cache miss handler 314 just needs to maintain the software controlled cache directory properly. Software controlled cache miss handler 314 updates a cache tag for the cache line then modifies the data pointer of the cache line to make it point to the location of the data line in the local direct buffer. As a result, the software controlled cache and direct buffers use the same local space for the global data accesses.

Now that some local space may be shared by direct buffering and software controlled cache, special attention is required when either or both direct buffering or software controlled cache tries to release the used space. As described previously, both direct buffering and software controlled cache obtain space from a shared local memory pool. When software controlled cache has to evict an existing cache line for an incoming cache line, the software controlled cache normally uses the data line previously used by the evicted cache line for the incoming cache line. However, using the illustrative runtime coherence maintenance scheme, software controlled cache miss handler 314 may not simply reuse the data line. The runtime, coherence maintenance scheme checks whether the data line is actually shared with direct buffering. If the data line is actually shared with direct buffering, reusing the data line may corrupt the data in direct buffers thus software controlled cache miss handler 314 has to obtain a new un-used data line. Similarly, special attention is required when direct buffers are released. Direct buffers are released together after the execution of the optimized loop. However, some data lines in direct buffers may be shared by software controlled cache. To release the local memory safely, runtime library 312 calls a cache eviction function of software controlled cache for each of the data lines shared by software controlled cache and direct buffers. To quickly check whether a data line is shared by direct buffering and software controlled cache, software controlled cache miss handler 314 adds a flag in the tag for a cache line.

Figure 12:
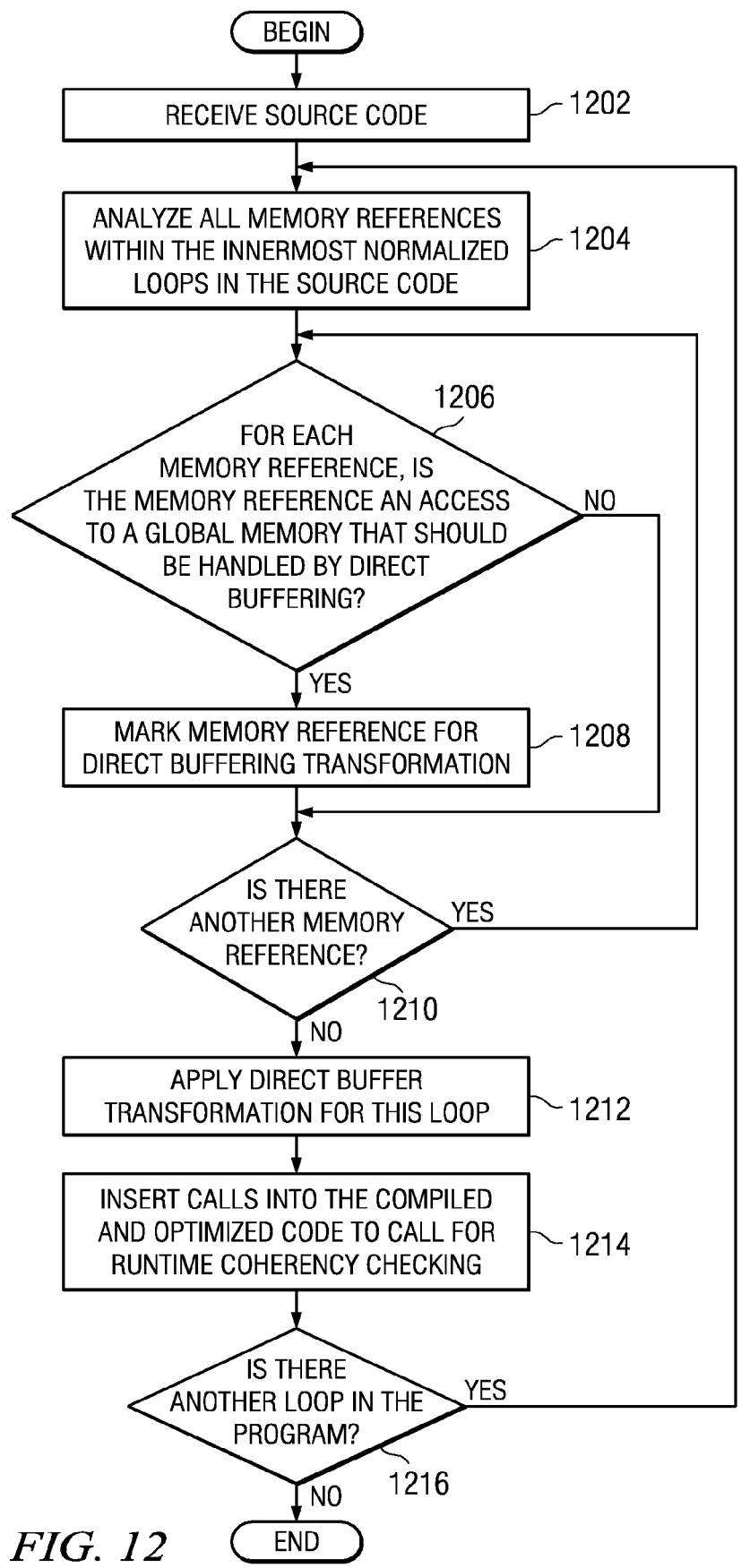
FIG. 12 depicts an exemplary operation for compile-time transformation in accordance with an illustrative embodiment.

FIG. 12 depicts an exemplary operation for compile-time transformation in accordance with an illustrative embodiment. For clarity, FIG. 12 only shows the operations for cases in which the compiler fails to guarantee that there are no coherence issues within the live range of direct buffers. For cases where the compiler is able to achieve that guarantee, previous known approaches are followed. The compile-time coherence checking applies direct buffering in the unit of a loop nest and decides on whether to optimize each of the data references to global memory within the loop nest. As the operation begins, a compiler receives source code that is to be compiled (step 1202). The compile-time coherence check module associated with the compiler analyzes the memory references within the innermost normialized loops in source code (step 1204). For each memory reference, the compile-time coherence check module identifies whether the memory reference is an access to global data that should be handled by direct buffering (step 1206). If at step 1206 the memory reference has to be handled by direct buffering, then the compile-time coherence check module marks the memory reference for direct buffering transformation (step 1208), with the operation proceeding to step 1210 thereafter.

From step 1208 or if at step 1206 the memory reference does not require handling by direct buffering, then the compile-time coherence check module determines if there is another memory reference (step 1210). If at step 1210 there is another memory reference, then the operation returns to step 1206. If at step 1210 there is not another memory reference, then the compile-time coherence check module applies a direct buffer transformation for the memory references marked for direct buffer transformation (step 1212). The compiler then inserts calls into compiled and optimized code to call for runtime coherency checking (step 1214). Then the compile-time coherence check module determines if there is another loop in the program (step 1216). If at step 1216 there is another loop, then the operation proceeds to step 1204. If at step 1216 there are not any other loops in the program, then the operation ends.

Comparing with previous known approaches, in the illustrative embodiments, the compiler does not have to give up direct buffering optimization even if the compiler cannot guarantee that there is no coherence problem within live range of direct buffers. Thus, the compiler can apply direct buffering optimizations whenever the compiler believes there is performance benefit. As a result, two kinds of coherence problems may occur at runtime within live range of direct buffers, i.e., coherence problems among direct buffers and coherence problems between software controlled data cache and direct buffers.

Figure 13:
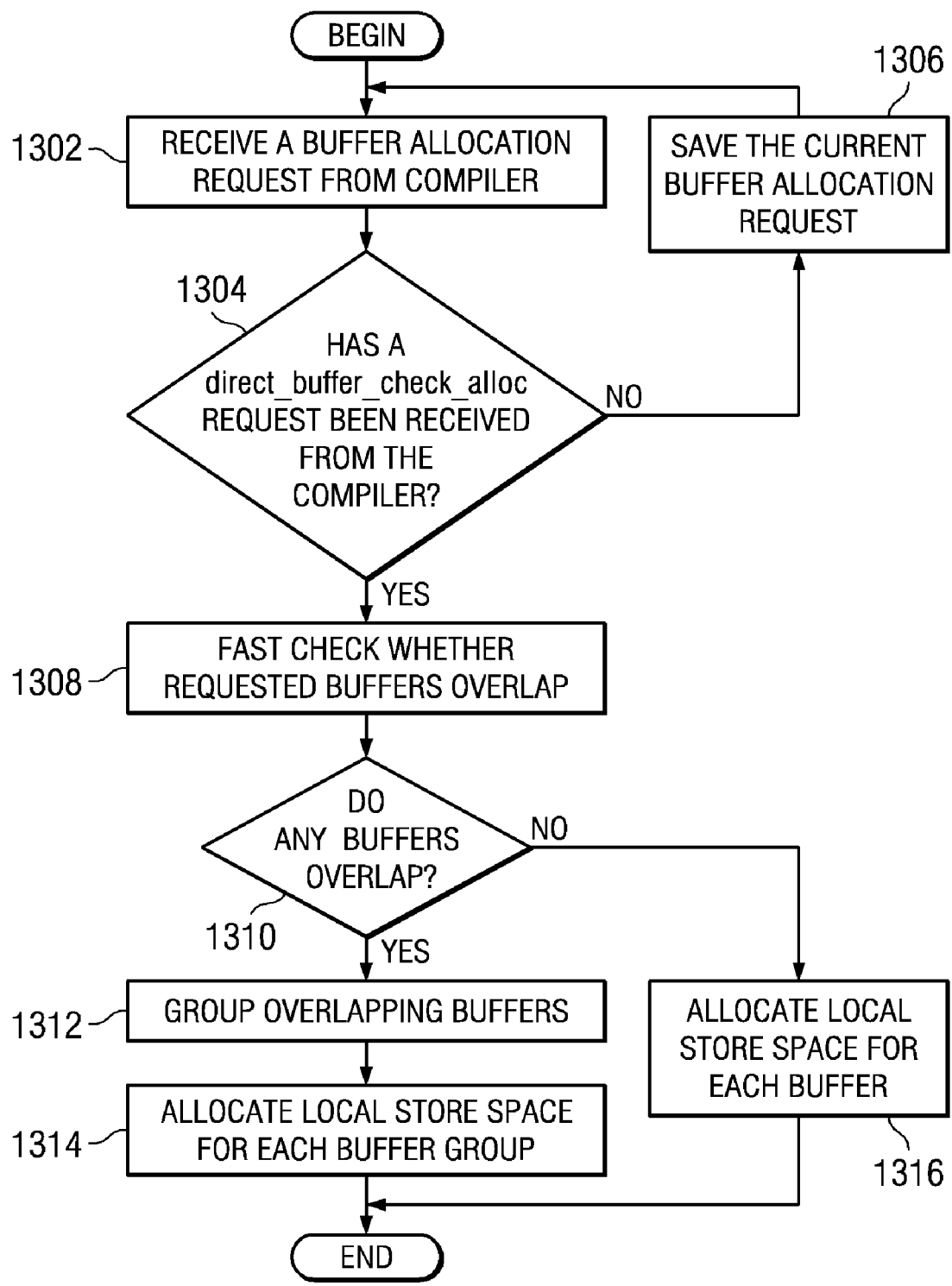
FIG. 13 depicts an exemplary operation of maintaining coherence between direct buffers at runtime in accordance with an illustrative embodiment.

FIG. 13 depicts an exemplary operation of maintaining coherence between direct buffers at runtime in accordance with an illustrative embodiment. As the operation begins, a runtime library receives one or more buffer allocation requests for a loop with proper information that were inserted into the compiled code by a compiler during compiling (step 1302). The proper information may include information, such as the direct buffers effective address (EA) space address, length and local space address, or the like. The runtime library then determines if all of the buffer allocation requests have been received by determining if a direct_buffer_check_alloc request has been received from the compiler (step 1304). If at step 1304 all of the buffer allocation requests have not been received, the runtime library saves the currently received buffer allocation request (step 1306) to a buffer directory data structure and the operation returns to step 1302.

At step 1304 if a direct_buffer_check_alloc request has been received from the compiler, the runtime library performs a fast check to determine whether any of the access ranges overlap with each other (step 1308). The overlapping detection step always incurs whenever the compiler fails to guarantee there is no coherence problem between buffers at compile time, so the overlapping detection is implemented very efficiently to reduce runtime overhead. By performing the direct_buffer_check_alloc function, the runtime library may detect any overlap in the access range of the direct buffer allocation requests (step 1310). Runtime library 312 of FIG. 3 performs the detection of any overlapping conditions regardless of whether or not actual overlapping exists and in such a way so as to reduce runtime overhead. The implementation of the overlap detection may require that the code be machine specific.

If at step 1310 the runtime library identifies access ranges that overlap, the runtime library groups the overlapping access ranges into access groups until none of the access groups overlaps with each other (step 1312). After access range overlap detection, the runtime library allocates contiguous space for each access group recorded in the buffer directory (step 1314), with the operation ending thereafter. If there is overlapping in access ranges, the runtime library ensures that there is only one copy for the overlapped portion. If at step 1310 the runtime library fails to identify access ranges that overlap, the runtime library allocates contiguous space for each direct buffer recorded in the buffer directory (step 1316), with the operation ending thereafter.

Using this operation, whenever two direct buffers overlap a portion of their access ranges, the direct buffers will share the same local buffer space for the overlapped portion, so there will be no coherence problems between different direct buffers.

Figure 14:
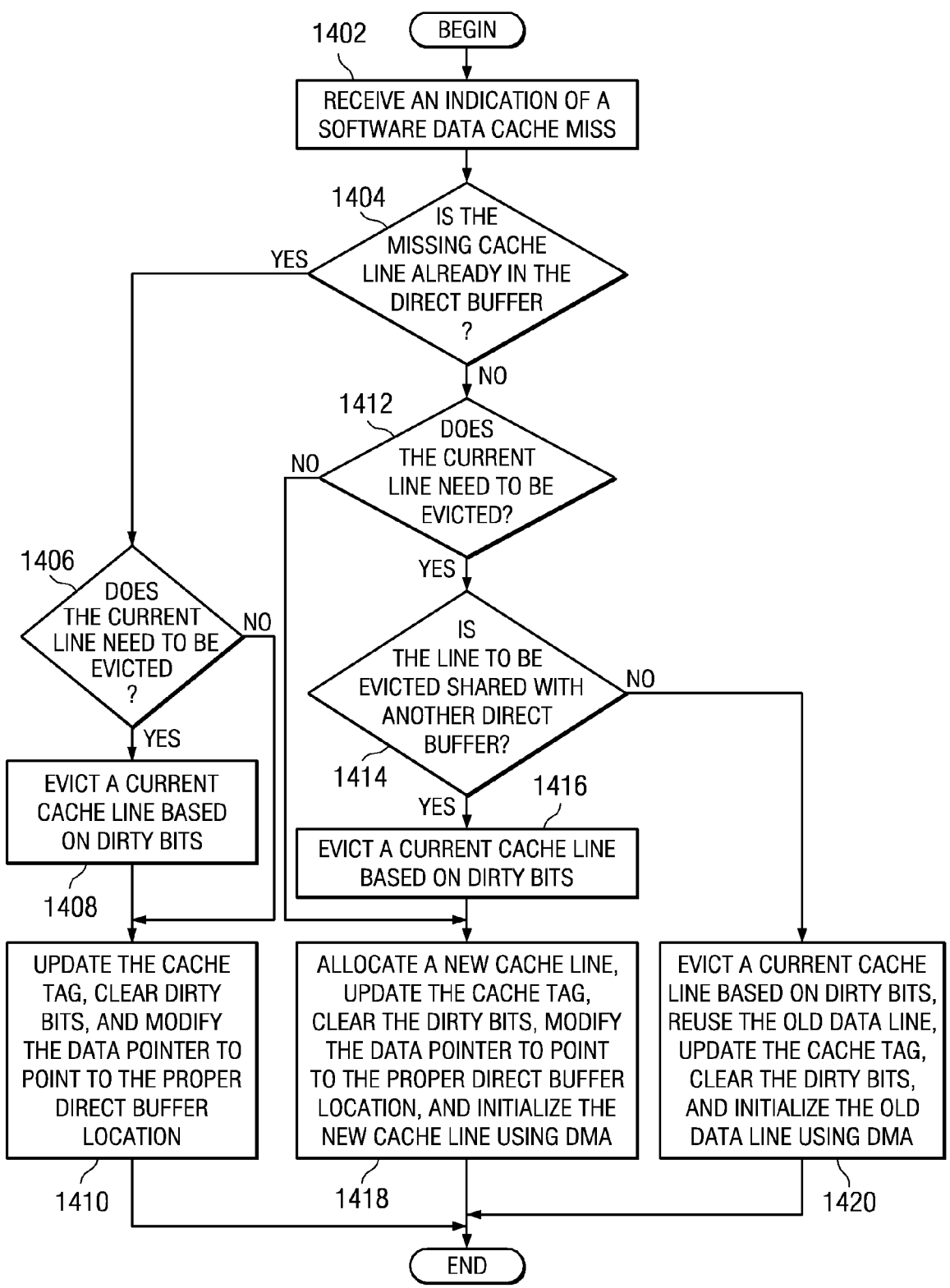
FIG. 14 depicts an exemplary operation of software controlled cache miss handling with runtime coherence maintenance in accordance with an illustrative embodiment.

As discussed above, in addition to ensuring coherence between different direct buffers, coherency may also be maintained between software controlled data cache and direct buffers within a loop. FIG. 14 depicts an exemplary operation of software controlled cache miss handling with runtime coherence maintenance in accordance with an illustrative embodiment. As the operation begins, the runtime library receives an indication that a software controlled cache miss has occurred (step 1402). The runtime library checks whether the missing global data line is in one or more of the direct buffer directories (step 1404). If at step 1404 the missing global data line is in one or more of the direct buffer directories, then the software controlled cache determines if an existing cache line needs to be evicted for the incoming cache line (step 1406). Even if the missing global data line is in one or more of the direct buffer directories, the incoming cache line still requires an empty cache line for the put operation.

If at step 1406 the software controlled cache has to evict a cache line, then the software controlled cache miss handler evicts a current cache line based on dirty bits (step 1408).

Then the software controlled cache miss handler updates a cache tag for the cache line, clears the dirty bits, and modifies the data pointer of the cache line to make the data pointer point to the location of the data line in the local direct buffer (step 1410), with the operation ending thereafter. If at step 1406 the software controlled cache does not have to evict a cache line, then the operation proceeds to step 1410, with the operation ending thereafter. As a result, the software controlled cache and direct buffers use the same local space for the global data accesses.

If at step 1404 the missing global data line fails to be in one or more of the direct buffer directories, then the software controlled cache determines if an existing cache line needs to be evicted for the incoming cache line (step 1412). If at step 1 412 the software controlled cache has to evict a cache line, then the runtime coherence maintenance scheme checks whether the data line is actually shared with direct buffering (step 1414). If at step 1414 the runtime coherence maintenance scheme determines that the data line is actually shared with direct buffering, then reusing the data line may corrupt the data in direct buffers. Thus, the software controlled cache miss handler evicts a current cache line based on dirty bits (step 1416). Then, the software controlled miss handler allocates a new cache line, clears the dirty bits, updates a cache tag for the cache line, and modifies the data pointer of the cache line to make the data pointer point to the location of the data line in the local direct buffer (step 1418), with the operation ending thereafter.

If at step 1414 the runtime coherence maintenance scheme determines that the data line is not shared with direct buffering, then the software controlled miss handler evicts a current cache line based on dirty bits, reuses the old data line, updates a cache tag for the cache line, clears the dirty bits, and initializes the old data line using direct memory access (DMA) (step 1420), with the operation ending thereafter. If at step 1412 the software controlled cache does not have to evict a cache line, then the operation proceeds to step 1418, with the operation ending thereafter.

Thus, in one illustrative embodiment, a mechanism is provided for dynamically maintaining coherency within a live range of direct buffers. The illustrative embodiments enable direct buffering optimizations for program loops previously not optimized due to limitations of compiler analysis. When compiler analysis fails to optimize a loop, the illustrative embodiments explore direct buffering optimizations maximally. The illustrative embodiments maintain coherence between software controlled data cache and direct buffers at runtime by guaranteeing that for any global data, there is only one copy of it in the local memory.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for reducing coherency problems, the method comprising:

receiving source code that is to be compiled;

analyzing the source code to identify at least one loop of a plurality of loops that contain a memory reference;

determining whether the memory reference is an access to a global memory that should be handled by a direct buffer in a local memory;

responsive to an indication that the memory reference is an access to the global memory that should be handled by the direct buffer in the local memory, marking the memory reference for direct buffer transformation;

applying the direct buffer transformation to the memory reference in order for at least one direct buffer to be created in the local memory for storing the memory reference;

responsive to receiving one or more buffer allocation requests for the at least one loop during execution of the compiled and optimized code, determining whether a direct buffer allocation check request has been received indicating that all buffer allocation requests have been received;

responsive to receiving the direct buffer allocation check request, determining whether any access ranges of the one or more buffer allocation requests overlap with each other; and responsive to none of the access ranges of the one or more buffer allocation requests overlapping with each other, allocating contiguous space in the local memory for each direct buffer recorded in a buffer directory data structure in the local memory corresponding to each buffer allocation request.

2. The method of claim 1, wherein the global memory is a memory data structure that provides the same address space for all processors and processor cores within the data processing system to which the global memory is coupled.

3. The method of claim 1, further comprising:

responsive to two or more of the access ranges of the one or more buffer allocation requests overlapping with each other, grouping the overlapping access ranges into access groups until none of the access groups overlap with each other; and allocating contiguous space in the local memory for each access group recorded in the buffer directory data structure in the local memory corresponding to each buffer allocation request.

4. The method of claim 1, further comprising:
responsive to a failure to receive the direct buffer allocation check request, saving a current buffer allocation request to the buffer directory data structure.

5. The method of claim 1, further comprising:
responsive to receiving an indication that a software controlled cache miss has occurred during execution of the compiled and optimized code, determining whether a missing global data line for the software controlled cache miss exists within the direct buffer;
responsive to the missing global data line existing within the direct buffer, determining whether an existing cache line needs to be evicted from the software controlled cache in the local memory for the missing global data line;
responsive to a determination that the existing cache line does not need to be evicted from the software controlled cache, updating a cache tag for the cache line;
clearing dirty bits associated with the cache line; and
modifying a data pointer of the cache line to make the data pointer point to a location of the missing global data line in the direct buffer.

6. The method of claim 5, further comprising:
responsive to a determination that the existing cache line needs to be evicted from the software controlled cache, evicting a current cache line from the software controlled cache based on dirty bits;
updating a cache tag for the cache line;
clearing dirty bits associated with the cache line; and
modifying a data pointer of the cache line to make the data pointer point to a location of the missing global data line in the direct buffer.

7. The method of claim 5, further comprising:
responsive to the missing global data line failing to exist within the direct buffer, determining whether an existing cache line needs to be evicted from the software controlled cache for the missing global data line;
responsive to a determination that the existing cache line needs to be evicted from the software controlled cache for the missing global data line, determining whether the existing cache line is shared with an associated current cache line in the direct buffer;
responsive to determining that the existing cache line is shared with an associated current cache line in the direct buffer, evicting the associated current cache line from the software controlled cache and the direct buffer based on dirty bits;
allocating a new cache line to the direct buffer;
clearing the dirty bits associated with the new cache line;
updating a cache tag for the new cache line; and
modifying a data pointer of the new cache line to make the data pointer point to a location of the missing global data line in the direct buffer.

8. The method of claim 7, further comprising:
responsive to determining that the existing cache line fails to be shared with direct buffering, evicting a current cache line from the software controlled cache based on dirty bits;
reusing a current cache line space associated with the current cache line in the software controlled cache for the existing cache line;
clearing the dirty bits associated with the existing cache line;
updating a cache tag for the existing cache line; and
initializing the existing cache line using direct memory access.

9. The method of claim 7, further comprising:
responsive to a determination that the existing cache line does not need to be evicted, allocating the new cache line in the direct buffer;
clearing the dirty bits associated with the new cache line;
updating the cache tag for the new cache line; and
modifying the data pointer of the new cache line to make the data pointer point to the location of the missing global data line in the direct buffer.

10. A computer program product comprising a computer recordable medium having a computer readable program recorded thereon, wherein the computer readable program, when executed on a computing device, causes the computing device to:
receive source code that is to be compiled;
analyze the source code to identify at least one loop of a plurality of loops that contain a memory reference;
determine whether the memory reference is an access to a global memory that should be handled by a direct buffer in a local memory;
responsive to an indication that the memory reference is an access to the global memory that should be handled by the direct buffer in the local memory, mark the memory reference for direct buffer transformation;
apply the direct buffer transformation to the memory reference in order for at least one direct buffer to be created in the local memory for storing the memory reference;
responsive to receiving one or more buffer allocation requests for the at least one loop during execution of the compiled and optimized code, determine whether a direct buffer allocation check request has been received indicating that all buffer allocation requests have been received;
responsive to receiving the direct buffer allocation check request, determine whether any access ranges of the one or more buffer allocation requests overlap with each other; and
responsive to none of the access ranges of the one or more buffer allocation requests overlapping with each other, allocate contiguous space in the local memory for each direct buffer recorded in a buffer directory data structure in the local memory corresponding to each buffer allocation request.

11. The computer program product of claim 10, wherein the global memory is a memory data structure that provides the same address space for all processors and processor cores within the data processing system to which the global memory is coupled.

12. The computer program product of claim 10, wherein the computer readable program to further causes the computing device to:
responsive to two or more of the access ranges of the one or more buffer allocation requests overlapping with each other, group the overlapping access ranges into access groups until none of the access groups overlap with each other; and
allocate contiguous space in the local memory for each access group recorded in the buffer directory data structure in the local memory corresponding to each buffer allocation request.

13. The computer program product of claim 10, wherein the computer readable program further causes the computing device to:
responsive to receiving an indication that a software controlled cache miss has occurred during execution of the compiled and optimized code, determine whether a missing global data line for the software controlled cache miss exists within the direct buffer;

responsive to the missing global data line existing within the direct buffer, determine whether an existing cache line needs to be evicted from the software controlled cache in the local memory for the missing global data line;

responsive to a determination that the existing cache line does not need to be evicted from the software controlled cache, update a cache tag for the cache line;

clear dirty bits associated with the cache line; and modify a data pointer of the cache line to make the data pointer point to a location of the missing global data line in the direct buffer.

14. An apparatus, comprising:

a processor; and a memory coupled to the processor, wherein the memory comprises instructions which, when executed by the processor, cause the processor to:

receive source code that is to be compiled;

analyze the source code to identify at least one loop of a plurality of loops that contain a memory reference;

determine whether the memory reference is an access to a global memory that should be handled by a direct buffer in a local memory;

responsive to an indication that the memory reference is an access to the global memory that should be handled by the direct buffer in a local memory, mark the memory reference for direct buffer transformation;

apply the direct buffer transformation to the memory reference in order for at least one direct buffer to be created in the local memory for storing the memory reference;

responsive to receiving one or more buffer allocation requests for the at least one loop during execution of the compiled and optimized code, determine whether a direct buffer allocation check request has been received indicating that all buffer allocation requests have been received;

responsive to receiving the direct buffer allocation check request, determine whether any access ranges of the one or more buffer allocation requests overlap with each other; and responsive to none of the access ranges of the one or more buffer allocation requests overlapping with each other, allocate contiguous space in the local memory for each direct buffer recorded in a buffer directory data structure in the local memory corresponding to each buffer allocation request.

15. The apparatus of claim 14, wherein the global memory is a memory data structure that provides the same address space for all processors and processor cores within the data processing system to which the global memory is coupled.

16. The apparatus of claim 14, wherein the instructions further cause the processor to:

responsive to two or more of the access ranges of the one or more buffer allocation requests overlapping with each other, group the overlapping access ranges into access groups until none of the access groups overlap with each other; and allocate contiguous space in the local memory for each access group recorded in the buffer directory data structure in the local memory corresponding to each buffer allocation request.

17. The apparatus of claim 14, wherein the instructions further cause the processor to:

responsive to receiving an indication that a software controlled cache miss has occurred during execution of the compiled and optimized code, determine whether a missing global data line for the software controlled cache miss exists within the direct buffer;

responsive to the missing global data line existing within the direct buffer, determine whether an existing cache line needs to be evicted from the software controlled cache in the local memory for the missing global data line;

responsive to a determination that the existing cache line does not need to be evicted from the software controlled cache, update a cache tag for the cache line;

clear dirty bits associated with the cache line; and modify a data pointer of the cache line to make the data pointer point to a location of the missing global data line in the direct buffer.

* * * * *